United States Patent
Teshima et al.

(10) Patent No.: US 9,440,307 B2
(45) Date of Patent: Sep. 13, 2016

(54) SPOT WELDING APPARATUS AND SPOT WELDING METHOD

(71) Applicants: Hideki Teshima, Miyoshi (JP);
Yoshinori Shibata, Nagoya (JP);
Tokujiro Konishi, Toyota (JP);
Masashi Furukawa, Toyota (JP)

(72) Inventors: Hideki Teshima, Miyoshi (JP);
Yoshinori Shibata, Nagoya (JP);
Tokujiro Konishi, Toyota (JP);
Masashi Furukawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 831 days.

(21) Appl. No.: 13/760,123

(22) Filed: Feb. 6, 2013

(65) Prior Publication Data
US 2013/0200047 A1    Aug. 8, 2013

(30) Foreign Application Priority Data

Feb. 8, 2012   (JP) .................................. 2012-25380

(51) Int. Cl.
*B23K 11/25*   (2006.01)
*B23K 11/11*   (2006.01)

(52) U.S. Cl.
CPC ............ *B23K 11/252* (2013.01); *B23K 11/115* (2013.01)

(58) Field of Classification Search
CPC .......................... B23K 11/115; B23K 11/252
USPC ......... 73/588, 602, 610, 617, 618, 622, 629, 73/632; 219/109, 110, 117.1, 124.34
See application file for complete search history.

(56) References Cited

U.S. PATENT DOCUMENTS

| | | | | |
|---|---|---|---|---|
| 3,384,733 A | * | 5/1968 | Burbank | G01N 29/11 219/109 |
| 3,726,130 A | * | 4/1973 | Hurlebaus | G01N 29/043 219/109 |
| 5,439,157 A | * | 8/1995 | Geier | B23K 31/12 228/5.7 |
| 5,777,229 A | * | 7/1998 | Geier | G01N 29/2412 228/104 |
| 5,920,014 A | * | 7/1999 | Waschkies | B23K 11/252 73/597 |
| 6,155,117 A | * | 12/2000 | Stevens | G01N 29/041 228/104 |
| 6,250,163 B1 | * | 6/2001 | MacLauchlan | G01N 29/2412 73/597 |
| 7,247,810 B2 | * | 7/2007 | Goetz | B23K 11/241 219/110 |
| 8,183,493 B2 | * | 5/2012 | Batzinger | B23K 11/252 219/109 |

(Continued)

FOREIGN PATENT DOCUMENTS

| | | |
|---|---|---|
| JP | 9-24476 | 1/1997 |
| JP | 10-216955 | 8/1998 |

(Continued)

*Primary Examiner* — Thien S Tran
(74) *Attorney, Agent, or Firm* — Finnegan, Henderson, Farabow, Garrett & Dunner, LLP

(57) ABSTRACT

The first embodiment of the invention is a spot welding method using a welding gun including a pair of electrodes holding and welding a welding point of a workpiece. The method including: transmitting an ultrasonic from one of the electrode pair to the workpiece with the electrode pair holding the workpiece; receiving the ultrasonic at the other electrode passed through the electrode pair and the workpiece; and detecting a holding state of the workpiece on the basis of an amplitude of the received ultrasonic. According to the embodiments of the invention, the welding gun can hold the workpiece at the proper position and with the correct angle, thereby reducing the welding flaws.

12 Claims, 6 Drawing Sheets

(56) References Cited

U.S. PATENT DOCUMENTS

| | | | |
|---|---|---|---|
| 2004/0083813 A1* | 5/2004 | Arndt | B23K 11/12 73/579 |
| 2004/0107774 A1* | 6/2004 | Arndt | B23K 11/257 73/602 |
| 2005/0132809 A1* | 6/2005 | Fleming | G01N 3/00 73/597 |
| 2006/0076321 A1* | 4/2006 | Maev | B23K 11/252 219/109 |
| 2006/0260403 A1* | 11/2006 | Waschkies | B23K 9/095 73/588 |
| 2010/0024558 A1* | 2/2010 | Shibata | B23K 11/115 73/628 |

FOREIGN PATENT DOCUMENTS

| | | |
|---|---|---|
| JP | 11-216573 | 8/1999 |
| JP | 2006-88160 | 4/2006 |
| JP | 2011-218369 | 11/2011 |
| JP | 2011-220714 | 11/2011 |

\* cited by examiner

FIG.5
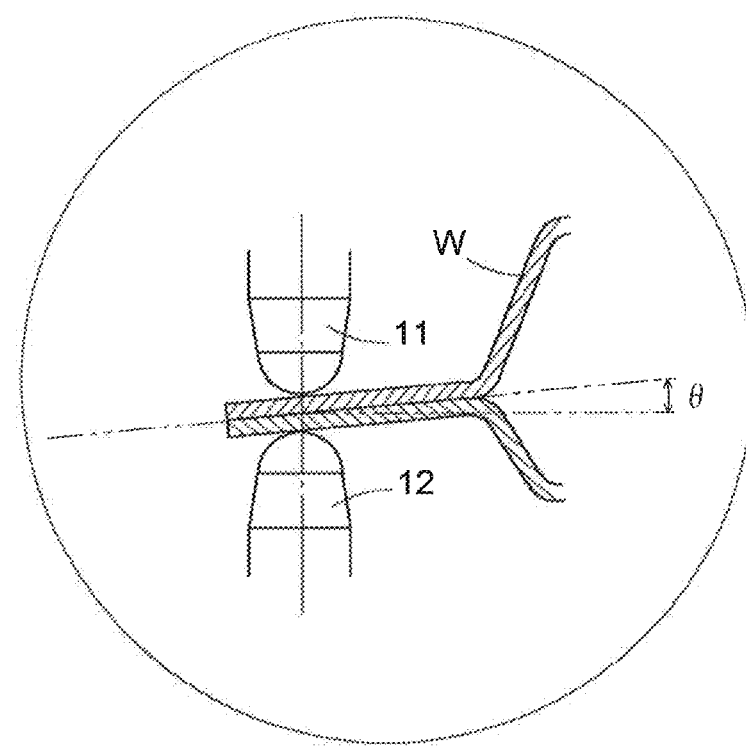
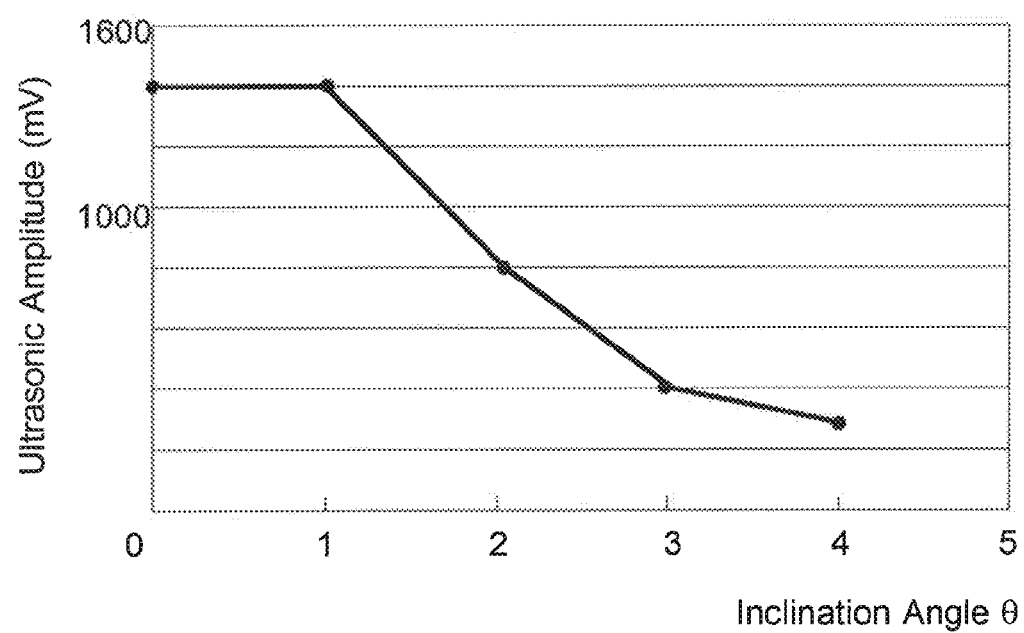

SPOT WELDING APPARATUS AND SPOT WELDING METHOD

BACKGROUND OF THE INVENTION

1. Field of the Invention

The present invention relates to a technique of spot welding.

2. Description of Related Art

Spot welding is one of a welding process for joining metals, applying an electrical current to a workpiece to melt the metals by the heat obtained from resistance. The conventional spot welding apparatus includes a welding gun for holding the workpiece and applying current thereto, and a transformer for applying a high electrical current to the welding gun. In the case that spot welding is performed to a large workpiece such as a vehicle body, the welding gun is mounted on an industrial robot.

For example, JP 2006-088160 A discloses a spot welding apparatus enabled to weld at an accurate welding position. The spot welding apparatus of JP 2006-088160 A determines whether the welding position is in the predetermined range by comparing a precise measurement data of a CAD data with an actual measurement data of the welding position obtained by a coordinate measuring machine.

BRIEF SUMMARY OF THE INVENTION

In the spot welding apparatus of JP 2006-088160 A, even if the actual measurement data is within the predetermined range of the precise measurement data, there may occur flaws such as an edge shot, which means that the electrical current partially runs off the edge, when the welding gun does not hold the workpiece at proper position or with proper angle. Accordingly, it is required for the welding gun to hold the workpiece at correct position and with proper posture in order to reduce welding defects.

The objective of the present invention is described above.

The first embodiment of the invention is a spot welding method using a welding gun including a pair of electrodes holding and welding a welding point of a workpiece. The method including: transmitting an ultrasonic from one of the electrode pair to the workpiece with the electrode pair holding the workpiece; receiving the ultrasonic at the other electrode passed through the electrode pair and the workpiece; and detecting a holding state of the workpiece on the basis of an amplitude of the received ultrasonic.

The preferable embodiment includes calculating a lap amount, which is a distance from the center of the electrodes to a first end of the workpiece located nearest to the center capable of being welded, on the basis of the amplitude of the received ultrasonic, while the welding gun holding the workpiece, and detecting the calculated lap amount as the holding state of the workpiece; and performing the spot welding in the case that the calculated lap amount is not smaller than a minimum lap amount required to perform the spot welding at the first end of the workpiece.

More advantageous embodiment includes correcting the holding position of the workpiece with the electrode pair on the basis of the difference between the calculated lap amount and the minimum lap amount, and performing the spot welding.

Furthermore, the embodiment includes correcting the holding position of the workpiece and performing the spot welding, in the case that a distance from the first end of the workpiece capable of being welded to a second end of the workpiece capable of being welded located on the extended line connecting the first end and the center of the electrode is not smaller than a sum of the calculated lap amount, the correction amount for correcting the holding position, a diameter of the electrode and an allowance set as a dimension to avoid the electrode contacting the second end of the workpiece.

The alternative embodiment includes calculating an inclination angle of the workpiece inclining against the plane perpendicular to the axis of the electrode on the basis of the amplitude of the ultrasonic, and detecting the inclination angle as the holding state of the workpiece, and performing the spot welding in the case that the calculated inclination angle is not larger than a tolerable angle required to perform the spot welding at the first end of the workpiece.

In the above embodiments, it is preferable to output an alert in the case that the spot welding is not performed.

The second embodiment of the invention is a spot welding apparatus which includes a welding gun with a pair of electrodes for holding and welding a welding point of a workpiece; an ultrasonic transmitter located at one of the electrode pair for transmitting an ultrasonic to the workpiece; an ultrasonic receiver located at the other of the electrode pair for receiving the ultrasonic passed through the electrode pair and the workpiece; and a controller for detecting a holding state of the workpiece on the basis of an amplitude of the received ultrasonic and controlling the welding gun on the basis of the holding state.

Preferably, the controller, while the welding gun holding the workpiece, calculates a lap amount, which is a distance from the center of the electrodes to a first end of the workpiece located nearest to the center capable of being welded, on the basis of the amplitude of the received ultrasonic, and detects the calculated lap amount as the holding state of the workpiece, and the controller performs the spot welding in the case that the calculated lap amount is not smaller than a minimum lap amount required to perform the spot welding at the first end of the workpiece.

More advantageously, the controller corrects the holding position of the workpiece with the electrode pair on the basis of the difference between the calculated lap amount and the minimum lap amount, and performs the spot welding.

Furthermore, the controller preferably corrects the holding position of the workpiece and performs the spot welding, in the case that a distance from the first end of the workpiece capable of being welded to a second end of the workpiece capable of being welded located on the extended line connecting the first end and the center of the electrode is not smaller than a sum of the calculated lap amount, the correction amount for correcting the holding position, a diameter of the electrode and an allowance set as a dimension to avoid the electrode contacting the second end of the workpiece.

In the alternative embodiment, the controller calculates an inclination angle of the workpiece inclining against the plane perpendicular to the axis of the electrode on the basis of the amplitude of the ultrasonic, and detects the inclination angle as the holding state of the workpiece, and the controller performs the spot welding in the case that the calculated inclination angle is not larger than a tolerable angle required to perform the spot welding at the first end of the workpiece.

In the above embodiments, it is preferable to output an alert in the case that the spot welding is not performed.

According to the embodiments of the invention, the welding gun can hold the workpiece at the proper position and with the correct angle, thereby reducing the welding flaws.

BRIEF DESCRIPTION OF THE DRAWINGS

FIG. 5 shows a correlation between an inclination angle θ and an ultrasonic amplitude D.

DETAILED DESCRIPTION OF THE INVENTION

Figure 1:
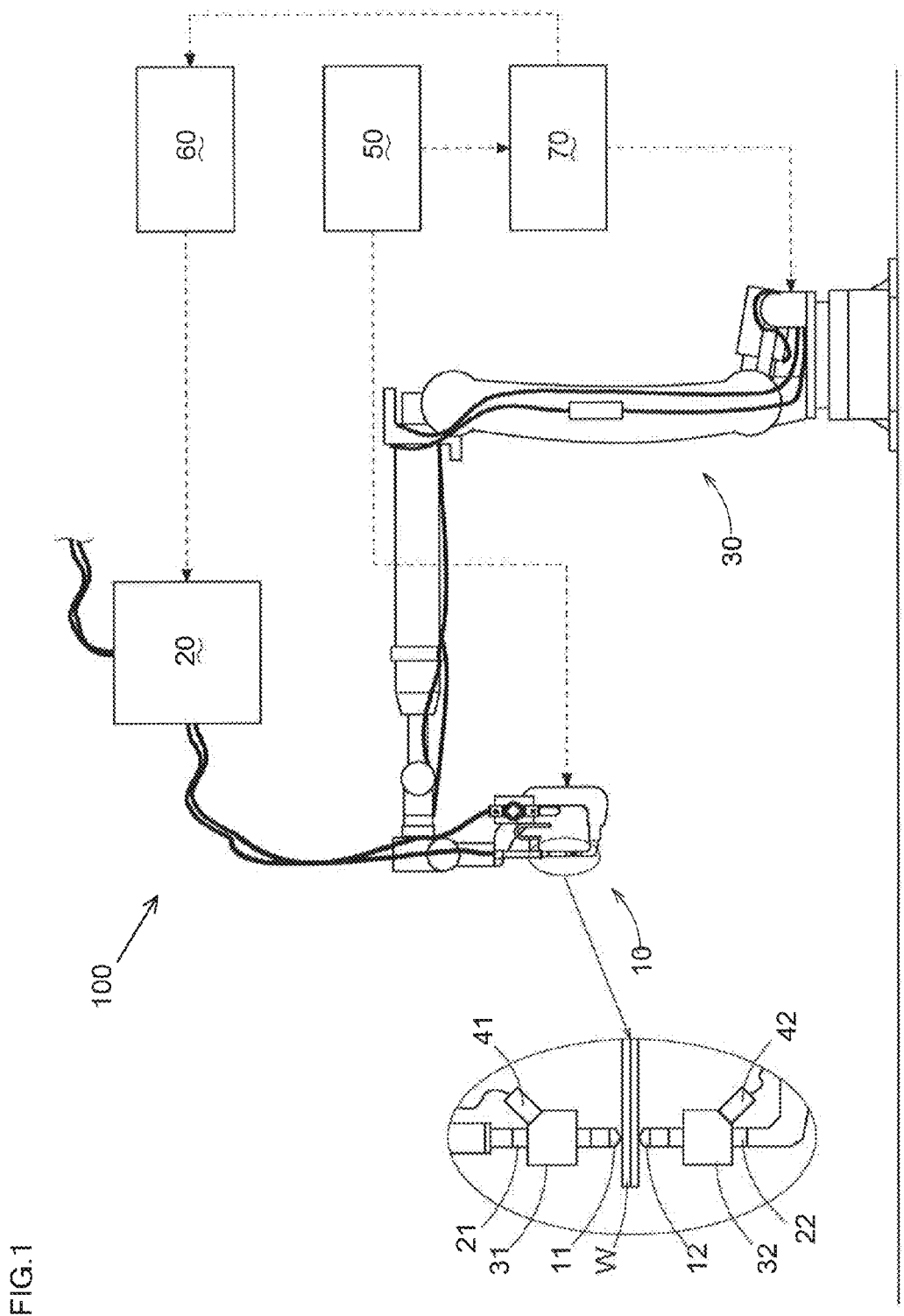
FIG. 1 depicts a structure of a spot welding apparatus.

FIG 1 shows a spot welding apparatus 100.

At the left side of FIG. 1, a welding gun 10 holding a workpiece W is depicted as enlarged in the drawing. The broken lines in FIG 1 show electrical cables.

The spot welding apparatus 100 is a welding device which holds the workpiece W and applies the electrical current to the workpiece to melt the metals by the heat obtained from the resistance. The workpiece W, in the embodiment, is a body of vehicle (the joining portion of the door open).

The spot welding apparatus 100 includes the welding gun 10, a power feeder 20, a robot hand 30 and a controller 50 for detecting the holding state of the workpiece W.

The welding gun 10 is used to weld workpiece W by applying an electrical current to the workpiece held therewith. The welding gun 10 is attached to the robot hand 30 being capable of changing the position and posture thereof. The welding gun 10 includes a pair of electrodes 11 and 12, a pair of shanks 21 and 22, a pair of wedges 31 and 32, and an ultrasonic transmitter 41 and an ultrasonic receiver 42.

The electrodes 11 and 12 hold the workpiece W, and the electrical current flows therebetween. The electrodes 11 and 12 are disposed coaxially along the axis perpendicular to the point on the workpiece W to be welded. The shanks 21 and 22 support the electrodes 11 and 12, respectively. The wedges 31 and 32 are located at the centers of the shanks 21 and 22, respectively, and they transmit the ultrasonic.

The ultrasonic transmitter 41 is mounted on the wedge 31. The ultrasonic transmitter 41 transmits the ultrasonic wave toward the workpiece W, holding the workpiece W with the electrodes 11 and 12.

The ultrasonic receiver 42 is mounted on the wedge 32. The ultrasonic receiver 42 receives the ultrasonic wave transmitted from the ultrasonic transmitter 41 passing through the wedge 31, the shank 21, the electrode 11, the electrode 12, the shank 22, and the shank 32 in order.

The power feeder 20 feeds a high electrical current to the electrodes 11 and 12 of the welding gun 10. The power feeder 20 has a transformer for raising the voltage of commercial power supply, and supplies the welding gun 10 with the high electrical current. The power feeder 20 is located near the robot hand 30. The power feeder 20 is connected to a welding controller 60.

The robot hand 30 is an industrial robot with multiple joints that controls the position and the posture of the welding gun 10. The robot hand 30 is connected to a robot controller 70.

The controller 50 controls the ultrasonic transmitter 41 to transmit the ultrasonic wave toward the electrodes 11, 12 of the welding gun 10 and the workpiece W, and controls the ultrasonic receiver 42 to receive the ultrasonic wave passing through them, with holding the workpiece W with the electrodes 11 and 12. The controller detects the holding state of the workpiece W by the electrodes 11 and 12 of the welding gun 10 on the basis of the amplitude of the ultrasonic wave received by the ultrasonic receiver 42. The controller 50 transmits the information to the robot controller 70 regarding whether to weld or not, whether the welding gun shots the edge or not, or whether the angle is right or not.

The welding controller 60 controls the power feeder 20 to feed the high electrical current to the welding gun 10. The robot controller 70 controls the robot hand 30 to change the position and the angle of the welding gun 10. The robot controller 70 transmits the information regarding whether to operate the welding or not to the welding controller 60.

Figure 2:
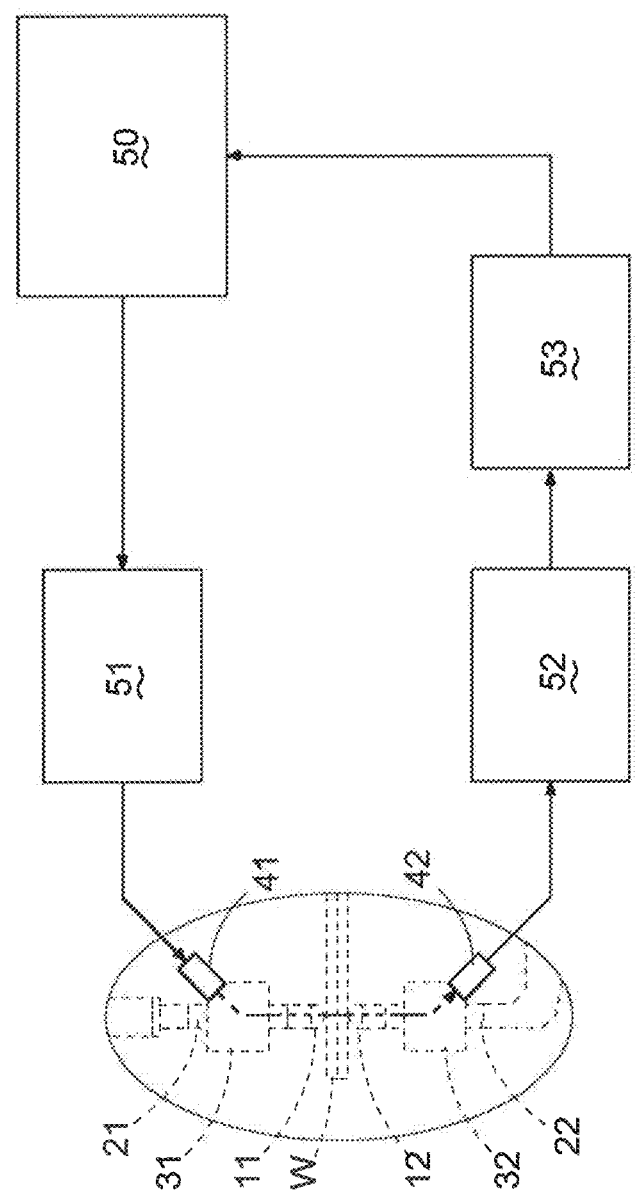
FIG. 2 shows a structure of electrical devices around a controller.

FIG. 2 depicts the electrical structure around the controller 50.

In FIG. 2, the welding gun 10 and the workpiece W are shown in broken lines. In FIG. 2, the transmission route of the ultrasonic wave is shown in two-dot chain line.

The ultrasonic transmitter 41 is connected to the controller 50 via an ultrasonic generator 51. The ultrasonic generator 51 produces the ultrasonic wave.

The ultrasonic receiver 42 is connected to the controller 50 via a preamplifier 52 and an A/D converter 53. The preamplifier 52 adjusts the signal gain of the ultrasonic signal obtained by the ultrasonic receiver 42. The A/D converter 53 converts the ultrasonic signal with the signal gain being adjusted by the preamplifier 52 to the digital signal.

As described above, the ultrasonic wave transmitted from the ultrasonic transmitter 41 passes through the pair of electrodes 11, 12 and the workpiece W to the ultrasonic receiver 42. Depending on the positional relationship between the electrode pair 11 and 12 and the workpiece W, the amplitude of the received ultrasonic may be varied. That is, detecting the amplitude of the ultrasonic as the holding state of the workpiece W, the controller 50 can control the movement of the welding gun 10 so as to reduce the welding flaws.

[First Embodiment]

Figure 3:
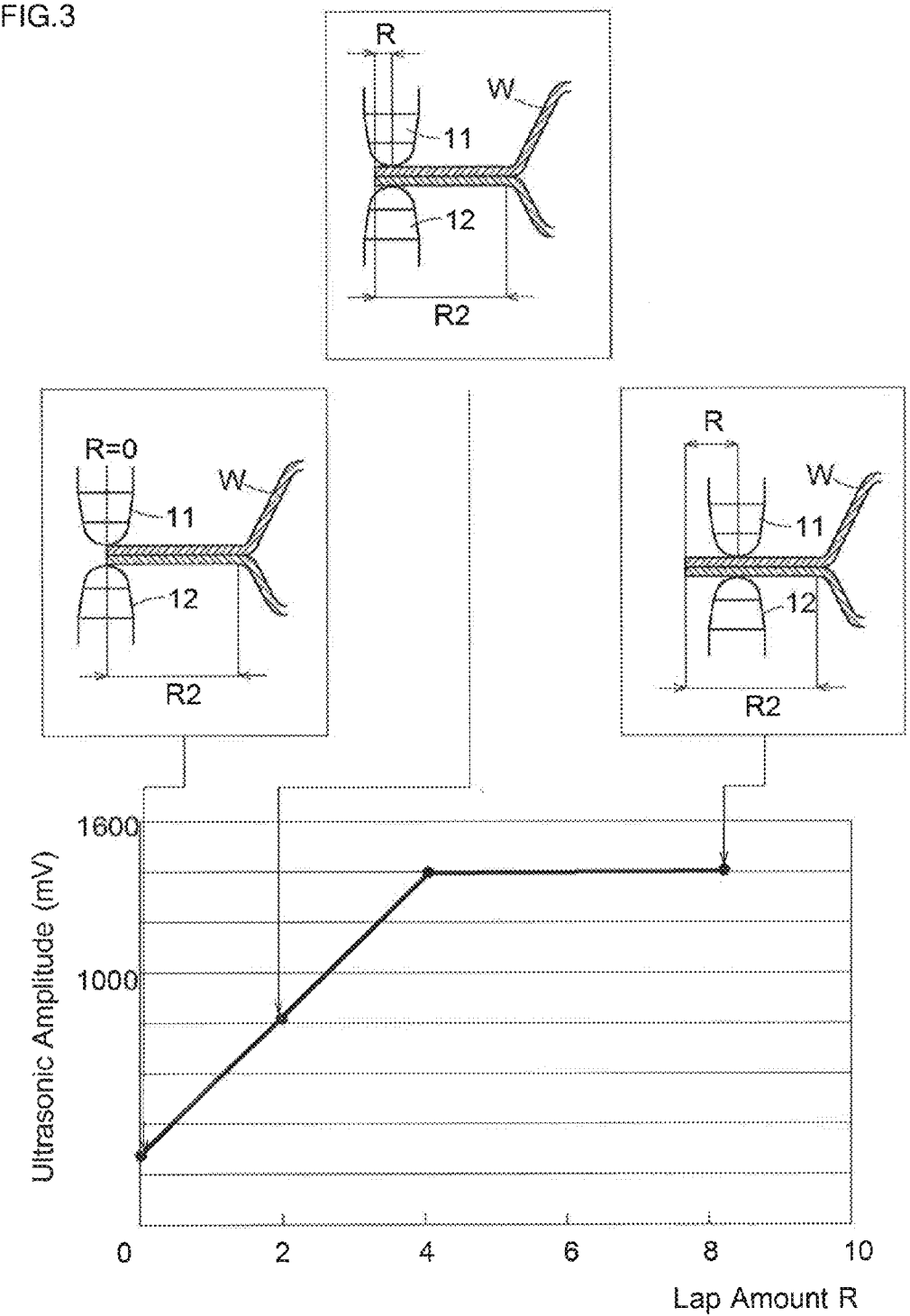
FIG. 3 shows a correlation between a lap amount R and an ultrasonic amplitude D.

Referring to FIG. 3, the correlation between a lap amount R and an ultrasonic amplitude D is described.

The lower side of FIG. 3 shows a graph of the ultrasonic amplitude D versus the lap amount R. The upper side of FIG. 3 shows the sectional view illustrating some states of lap amount R.

The lap amount R is an index of the holding state of workpiece W with the electrodes 11 and 12. The lap amount R means the distance from the center (axis) of the electrode pair 11 and 12 to the end of the workpiece W located nearest to the center, which is capable of being welded, while the electrodes 11 and 12 of the welding gun 10 hold the workpiece W The end of the workpiece W capable of being welded means the portion such as the end face of the workpiece or the vicinity of the flange, and where the shape of the portion to be welded is changed from flat.

Total lap amount R2, shown in FIG. 3, is the distance between the first end of the workpiece W capable of being welded nearest to the center (axis) of the electrode pair 11, 12 and the second end of the workpiece W capable of being welded located on the extended line connecting the first end with the center, namely the total lap amount R2 means the weldable length of the workpiece W.

The ultrasonic amplitude D is the amplitude of the ultrasonic received by the ultrasonic receiver 42.

Regarding the correlation between the lap amount R and the ultrasonic amplitude D, as the lap amount R becomes larger, the ultrasonic amplitude D becomes larger, and if the lap amount R is larger than a predetermined value, the ultrasonic amplitude D is constant.

Generally, the transmitting speed of the ultrasonic wave in air is much slower than in the rigid body (e.g. the electrodes 11 and 12, the workpiece W). The acoustic impedance of the rigid body is quite different from that of air. So, the ultrasonic transmitted in the rigid body hardly travels into air.

Small lap amount R indicates that the electrodes 11 and 12 hold the workpiece W at the vicinity of the end of the workpiece. So, as the lap amount R becomes smaller, the amount of ultrasonic transmitted to the workpiece W becomes smaller. The strength of the ultrasonic oscillated from the ultrasonic transmitter 41 becomes weak when the ultrasonic passes through the electrode pair 11, 12 and the workpiece W and reaches the ultrasonic receiver 42, whereby the ultrasonic amplitude becomes small. As described above, the correlation between the lap amount R and the ultrasonic, amplitude D is obtained.

Figure 4:
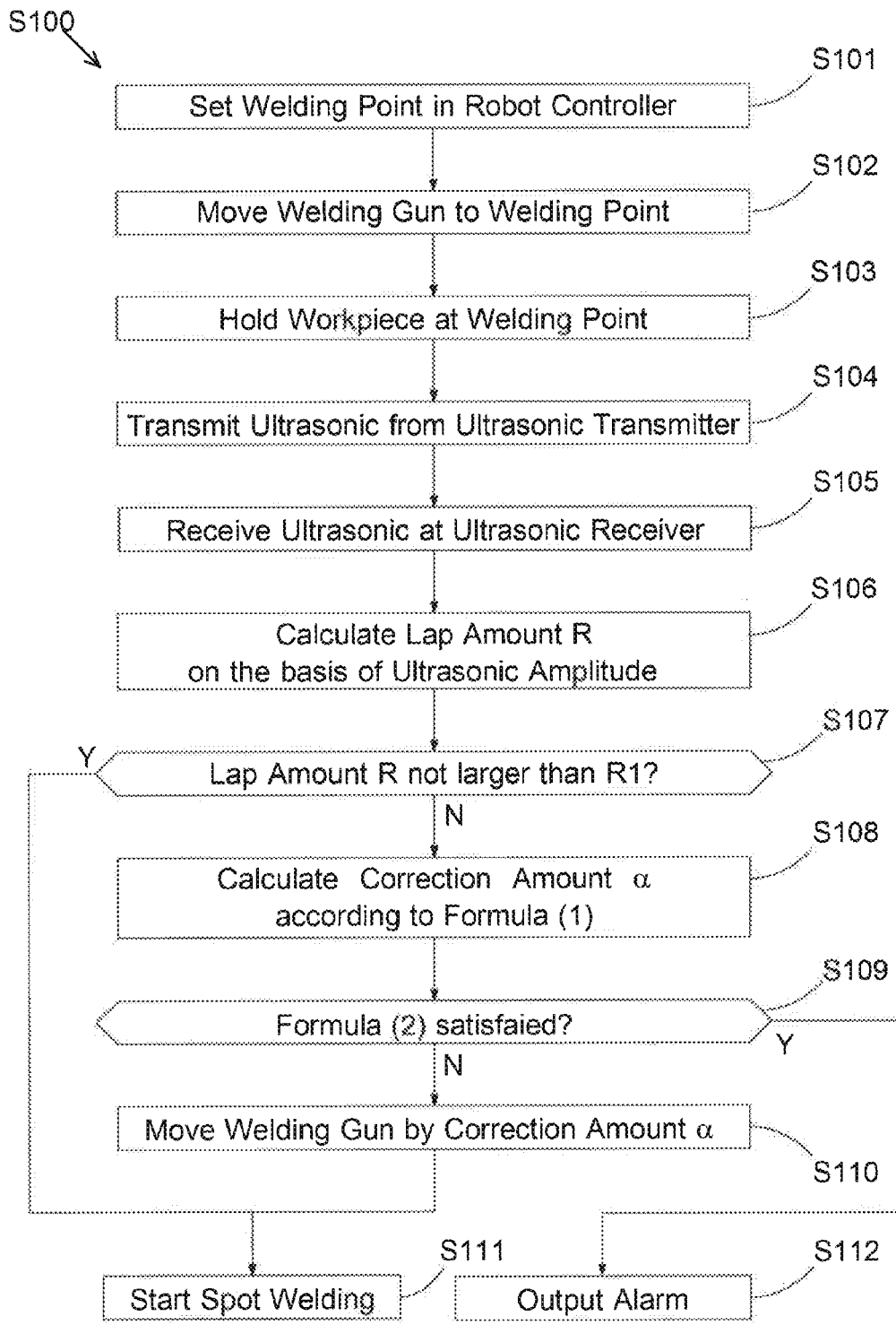
FIG. 4 is a flowchart of controlling the spot welding according to the first embodiment.

Referring to FIG. 4, a spot welding step S100 for controlling the spot welding is described below.

In the step S101, the operator set the welding point in the workpiece W in the robot controller 70. In the step S102, the robot controller 70 controls the robot hand 30 to move the welding gun 10 to the welding point. In the step S103, the robot controller 70 controls the welding gun 10 to hold the workpiece W.

In the step S104, the controller 50 controls the ultrasonic generator 51 to generate the ultrasonic and the ultrasonic transmitter 41 to transmit the ultrasonic.

In the step S105, the ultrasonic receiver 42 receives the ultrasonic transmitted from the ultrasonic transmitter 41 and passed through the electrode pair 11, 12 and the workpiece W. The preamplifier 52 adjusts the signal gain that is received at the ultrasonic receiver 42, and the A/D converter 53 converts the ultrasonic signal to the digital signal, That digital signal is transmitted to the controller 50.

In the step S106, the controller 50 calculates the lap amount R on the basis of the ultrasonic amplitude D of the received signal by using the correlation between the lap amount R and the ultrasonic amplitude D. Note that the correlation of the lap amount R and the ultrasonic amplitude D is stored in the controller 50 in advance.

In the step S107, the controller 50 determines whether the lap amount R calculated in the step S106 is larger than a predetermined lap amount R1 or not. The predetermined lap amount R1 is a minimum lap amount required to perform the spot welding without occurring joint defects after welding the end of the workpiece W, that is an allowable distance between the center of the electrode pair 11, 12 and the end of the workpiece W. The lap amount R1 is stored in the controller 50 in advance.

If the lap amount R is not smaller than the predetermined lap amount R1, the step S111 is performed. If the lap amount R is smaller the predetermined lap amount R1, the step S108 is performed.

In the step S108, the controller 50 calculates a correction mount a according to the formula (1) below.

[Correction Amount α]=[Predetermined Lap Amount R1]−[Lap Amount R]  [Formula (1)]

In the step S109, the controller 50 checks whether the formula (2) is satisfied or not. If the formula (2) is satisfied, the welding gun 10 cannot be moved by the correction amount α, and the step S112 is performed. If the formula (2) is not satisfied, the step S110 is performed.

[Total Lap Amount R2]<[Lap Amount R]+[Correction Amount α]+[Diameter of Electrode d]+[Allowance β3]  [Formula (2)]

The allowance β in the formula (2) is set as a dimension to avoid the electrodes 11. and 12 contacting the second end of the workpiece W. If the sum of the lap amount R, the correction amount α and the diameter d is not larger than the total lap amount R2, the electrodes 11 and 12 can he prevented from contacting the second end of the workpiece W, however, there may he a dimensional tolerance in the electrode diameter d. Therefore, the allowance β is defined, and if the formula (2) is not satisfied, the welding gun 10, namely the electrodes 11 and 12, can be moved without contact with the second end of the workpiece W.

In the step S110, the robot controller 70 controls the robot hand 30 to move the welding gun 10 by the correction amount α. In the step S111, the welding controller 60 controls the power feeder 20 to feed the high electrical current to the electrodes 11 and 12, thereby operating the spot welding.

In the step S112, the controller 50 outputs the alarm on the monitor or the like, and alerts the operator.

According to the spot welding step S100, the welding gun 10 can hold the workpiece W at the proper position, thereby reducing the welding defect such as the edge shot; the welding current runs off the flange end of the workpiece W.

[Second Embodiment]

Referring to FIG. 5, the correlation between an inclination angle θ and an ultrasonic amplitude D is described.

The lower side of FIG. 5 shows a graph of the ultrasonic amplitude D versus the inclination angle θ. The upper side of FIG. 5 shows the sectional view illustrating the inclination angle θ, where the workpiece W is held with the electrodes 11 and 12 of the welding gun 10.

The inclination angle θ is an index of the holding state of workpiece W with the electrodes 11 and 12. The inclination angle θ means the angle between the workpiece W and the plane perpendicular to axes of the electrodes 11 and 12, while the electrodes 11 and 12 of the welding gun 10 hold the workpiece W.

Generally, the transmitting speed of the ultrasonic wave in air is much slower than in the rigid body (e.g. the electrodes 11 and 12, the workpiece W). The acoustic impedance of the rigid body is quite different from that of air. So, the ultrasonic transmitted in the rigid body hardly travels into air.

As the inclination angle θ becomes larger, the contact area between the electrodes 11 and 12 and the workpiece W becomes smaller and the amount of ultrasonic transmitted to the workpiece W becomes smaller. The strength of the ultrasonic oscillated from the ultrasonic transmitter 41 becomes weak when the ultrasonic passes through the electrode pair 11, 12 and the workpiece W and reaches the ultrasonic receiver 42, whereby the ultrasonic amplitude becomes small. As described above, the correlation between the inclination angle θ and the ultrasonic amplitude D is obtained.

Figure 6:
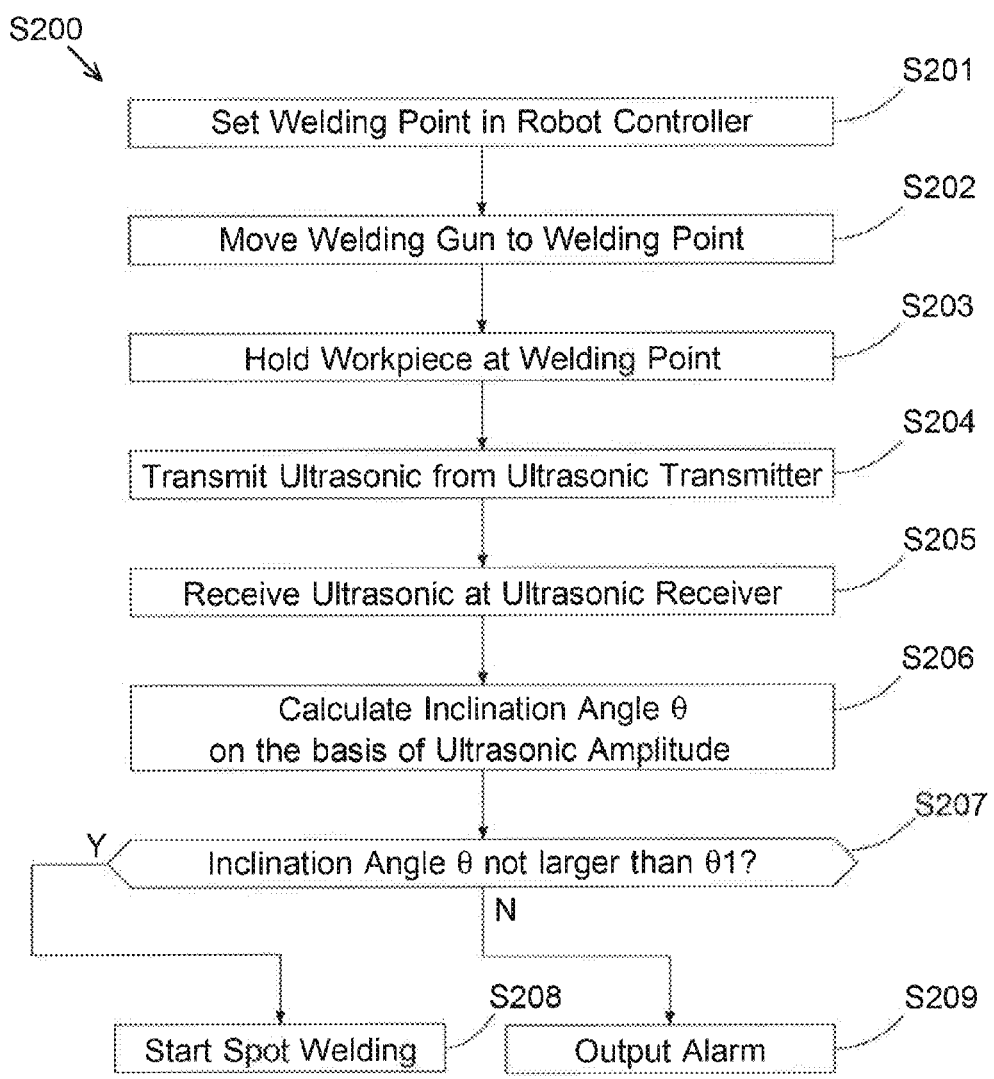
FIG. 6 is a flowchart of controlling the spot welding according to the second embodiment.

Referring to FIG. 6, a spot welding step S200 for controlling the spot welding is described below.

In the step S201, the operator set the welding point of the workpiece W in the robot controller 70. In the step S202, the robot controller 70 controls the robot hand 30 to move the welding gun 10 to the welding point. In the step S203, the robot controller 70 controls the welding gun 10 to hold the workpiece W.

In the step S204, the controller 50 controls the ultrasonic generator 51 to generate the ultrasonic and the ultrasonic transmitter 41 to transmit the ultrasonic.

In the step S205, the ultrasonic receiver 42 receives the ultrasonic transmitted from the ultrasonic transmitter 41 and passed through the electrodes 11, 12 and the workpiece W. The preamplifier 52 adjusts the signal gain that is received at the ultrasonic receiver 42, and the A/D converter 53 converts the ultrasonic signal to the digital signal. That digital signal is transmitted to the controller 50.

In the step S206, the controller 50 calculates the inclination angle θ on the basis of the ultrasonic amplitude D of the received signal by using the correlation between the inclination angle θ and the ultrasonic amplitude D. Note that the correlation of the inclination angle θ and the ultrasonic amplitude D is stored in the controller 50 in advance.

In the step S207, the controller 50 determines whether the inclination angle θ calculated in the step S206 is larger than a predetermined inclination angle θ1 or not. The predetermined inclination angle θ1 is a tolerable levelness required to perform the spot welding without occurring joint defects after the spot welding, that is an uprightness of the workpiece W against the center of the electrodes 11 and 12. The predetermined inclination angle θ1 is stored in the controller 50 in advance.

If the inclination angle θ is not larger than the predetermined inclination angle θ1, the step S208 is performed. If the inclination angle θ is larger than the predetermined inclination angle θ1, the step S209 is performed.

In the step S208, the welding controller 60 controls the power feeder 20 to feed the high electrical current to the electrodes 11 and 12, thereby operating the spot welding.

In the step S209, the controller 50 outputs the alarm on the monitor or the like, and alerts the operator.

According to the spot welding step S200, the welding gun 10 can hold the workpiece W with the proper angle, thereby reducing the welding defects and securing the quality of spot welding.

What is claimed is:

1. A spot welding method using a welding gun including a pair of electrodes holding and welding a welding point of a workpiece, the method comprising:
    transmitting an ultrasonic from one of the electrode pair to the workpiece with the electrode pair holding the workpiece;
    receiving the ultrasonic at the other electrode passed through the electrode pair and the workpiece; and
    detecting a holding state of the workpiece on a basis of an amplitude of the received ultrasonic.

2. The spot welding method according to claim 1, wherein
    while the welding gun holding the workpiece, calculating a lap amount, which is a distance from a center of the electrodes to a first end of the workpiece located nearest to the center of the electrodes capable of being welded, on the basis of the amplitude of the received ultrasonic, and detecting the calculated lap amount as the holding state of the workpiece, and
    performing the spot welding when the calculated lap amount is not smaller than a minimum lap amount required to perform the spot welding at the first end of the workpiece.

3. The spot welding method according to claim 2, wherein
    correcting a holding position of the workpiece with the electrode pair on the basis of a difference between the calculated lap amount and the minimum lap amount, and
    performing the spot welding.

4. The spot welding method according to claim 3, wherein
    correcting the holding position of the workpiece and performing the spot welding, when a distance from the first end of the workpiece capable of being welded to a second end of the workpiece capable of being welded located on an extended line connecting the first end of the workpiece and the center of the electrode is not smaller than a sum of the calculated lap amount, a correction amount for correcting the holding position, a diameter of the electrode and an allowance set as a dimension to avoid the electrode contacting the second end of the workpiece.

5. The spot welding method according to claim 1, wherein
    calculating an inclination angle of the workpiece inclining against the plane perpendicular to the axis of the electrode on the basis of the amplitude of the ultrasonic, and detecting the inclination angle as the holding state of the workpiece, and
    performing the spot welding when the calculated inclination angle is not larger than a tolerable angle required to perform the spot welding at a first end of the workpiece.

6. The spot welding method according to claim 4, wherein outputting an alert in the case that the spot welding is not performed.

7. A spot welding apparatus comprising:
    a welding gun with a pair of electrodes for holding and welding a welding point of a workpiece;
    an ultrasonic transmitter located at one of the electrode pair for transmitting an ultrasonic to the workpiece;
    an ultrasonic receiver located at the other of the electrode pair for receiving the ultrasonic passed through the electrode pair and the workpiece; and
    a controller for detecting a holding state of the workpiece on a basis of an amplitude of the received ultrasonic and controlling the welding gun on the basis of the holding state.

8. The spot welding apparatus according to claim 7, wherein
    the controller, while the welding gun holding the workpiece, calculates a lap amount, which is a distance from a center of the electrodes to a first end of the workpiece located nearest to the center of the electrodes capable of being welded, on the basis of the amplitude of the received ultrasonic, and detects the calculated lap amount as the holding state of the workpiece, and
    the controller performs the spot welding when the calculated lap amount is not smaller than a minimum lap amount required to perform the spot welding at the first end of the workpiece.

9. The spot welding apparatus according to claim 8, wherein
    the controller corrects a holding position of the workpiece with the electrode pair on the basis of the difference between the calculated lap amount and the minimum lap amount, and performs the spot welding.

10. The spot welding apparatus according to claim 9, wherein
    the controller corrects the holding position of the workpiece and performs the spot welding, when a distance from the first end of the workpiece capable of being welded to a second end of the workpiece capable of being welded located on an extended line connecting the first end of the workpiece and the center of the electrode is not smaller than a sum of the calculated lap amount, a correction amount for correcting the holding position, a diameter of the electrode and an allowance set as a dimension to avoid the electrode contacting the second end of the workpiece.

11. The spot welding apparatus according to claim 7, wherein
   the controller calculates an inclination angle of the workpiece inclining against a plane perpendicular to the axis of the electrode on the basis of the amplitude of the ultrasonic, and detects the inclination angle as the holding state of the workpiece, and
   the controller performs the spot welding when the calculated inclination angle is not larger than a tolerable angle required to perform the spot welding at the first end of the workpiece.

12. The spot welding apparatus according to claim 10, wherein
   the controller outputs an alert in the case that the spot welding is not performed.

* * * * *